(12) United States Patent
Mueller et al.

(10) Patent No.: US 12,079,086 B2
(45) Date of Patent: Sep. 3, 2024

(54) TRANSCEIVER DEVICE

(71) Applicant: NXP B.V., Eindhoven (NL)

(72) Inventors: Steffen Mueller, Hamburg (DE); Lucas Pieter Lodewijk van Dijk, Kranenburg (DE); Georg Olma, Grasbrunn (DE); Joachim Josef Maria Kruecken, Munich (DE)

(73) Assignee: NXP B.V., Eindhoven (NL)

( * ) Notice: Subject to any disclaimer, the term of this patent is extended or adjusted under 35 U.S.C. 154(b) by 127 days.

(21) Appl. No.: 17/804,936

(22) Filed: Jun. 1, 2022

(65) Prior Publication Data

US 2022/0393788 A1    Dec. 8, 2022

(30) Foreign Application Priority Data

Jun. 3, 2021    (EP) .................................... 21177600

(51) Int. Cl.
    *G06F 11/00*    (2006.01)
    *G06F 11/07*    (2006.01)
    (Continued)

(52) U.S. Cl.
    CPC ........ *G06F 11/142* (2013.01); *G06F 11/0739* (2013.01); *G06F 11/0793* (2013.01);
    (Continued)

(58) Field of Classification Search
    CPC ............. G06F 11/0739; G06F 11/0751; G06F 11/0754; G06F 11/0766; G06F 11/0793;
    (Continued)

(56) References Cited

U.S. PATENT DOCUMENTS 6,439,462 B1    8/2002    Dickson et al.
7,046,722 B2 *    5/2006    Muth ................... G06F 13/385
                                                            375/219

(Continued)

FOREIGN PATENT DOCUMENTS

| DE | 102005037723 A1 | 2/2007 |
|----|-----------------|--------|
| EP | 3373526 A1      | 9/2018 |
| WO | WO-2018/104929 A1 | 6/2018 |

OTHER PUBLICATIONS

International Organization for Standardization; Draft International Standard ISO 11898-3 .2—Road vehicles—Controller area network (CAN)—Part 3: Low-speed, fault-tolerant, medium dependent interface; 30 pages (2005).

(Continued)

*Primary Examiner* — Joseph D Manoskey

(57) ABSTRACT

The disclosure relates to a transceiver device for communicating between a network protocol controller and a network bus, the transceiver device comprising: transceiver circuitry configured to transmit and receive data on the network bus using a first physical layer protocol; and monitoring circuitry configured to determine a measured property of the network bus, in which the transceiver device is configured to: determine whether the measured property indicates an error condition; and reconfigure the transceiver circuitry to transmit and receive data on the network bus using a second physical layer protocol in response to determining the error condition.

22 Claims, 6 Drawing Sheets

(51) Int. Cl.
*G06F 11/14* (2006.01)
*G06F 11/30* (2006.01)
*H04L 1/00* (2006.01)
*H04L 12/40* (2006.01)
*H04L 43/0823* (2022.01)

(52) U.S. Cl.
CPC ........ *G06F 11/3027* (2013.01); *H04L 1/0006* (2013.01); *H04L 12/40* (2013.01); *H04L 43/0847* (2013.01); *H04L 2012/40215* (2013.01)

(58) Field of Classification Search
CPC .. G06F 11/142; G06F 11/221; G06F 11/3027; H04L 1/0006; H04L 12/40; H04L 43/0847; H04L 2012/40215
See application file for complete search history.

(56) References Cited

U.S. PATENT DOCUMENTS

| | | | |
|---|---|---|---|
| 8,625,295 | B2 | 1/2014 | Alley et al. |
| 8,750,351 | B2 | 6/2014 | Muth |
| 9,112,721 | B2 | 8/2015 | Behrens et al. |
| 10,284,388 | B2 | 5/2019 | Kishingami et al. |
| 10,445,107 | B2 | 10/2019 | Sun et al. |
| 10,454,705 | B2 | 10/2019 | Hartwich et al. |
| 10,785,066 | B1 | 9/2020 | van Dijk |
| 10,791,002 | B2 | 9/2020 | de Haas et al. |
| 10,826,719 | B2 | 11/2020 | Muth et al. |
| 10,838,906 | B1 | 11/2020 | van Dijk |
| 11,038,508 | B2 | 6/2021 | de Haas et al. |
| 11,061,844 | B2 | 7/2021 | de Haas et al. |
| 2001/0009553 | A1 | 7/2001 | Homann |
| 2004/0119517 | A1 | 6/2004 | Pauletti et al. |
| 2012/0051241 | A1 | 3/2012 | Mori et al. |
| 2012/0297105 | A1 | 11/2012 | Elend |
| 2014/0350772 | A1 | 11/2014 | Saito |
| 2017/0048085 | A1 | 2/2017 | Munoz et al. |
| 2017/0168976 | A1 | 6/2017 | Yost |
| 2018/0198481 | A1 | 7/2018 | Bavois |
| 2018/0205572 | A1 | 7/2018 | Kishingami et al. |
| 2018/0227145 | A1 | 8/2018 | Brochi et al. |
| 2018/0309590 | A1 | 10/2018 | Beckmann et al. |
| 2019/0017311 | A1 | 1/2019 | McGettrick et al. |
| 2019/0215233 | A1 | 7/2019 | Huang et al. |
| 2020/0213351 | A1 | 7/2020 | Shin et al. |
| 2020/0267018 | A1 | 8/2020 | Gupta et al. |
| 2020/0287746 | A1* | 9/2020 | Kotani .............. H04L 12/40143 |
| 2020/0382340 | A1 | 12/2020 | Muth |
| 2020/0403823 | A1 | 12/2020 | van Dijk |
| 2020/0412583 | A1 | 12/2020 | Walker et al. |
| 2021/0120017 | A1 | 4/2021 | Antonsson |
| 2021/0218596 | A1* | 7/2021 | Wang .................. H04L 41/0654 |
| 2021/0224079 | A1 | 7/2021 | Muth |
| 2021/0399919 | A1* | 12/2021 | Mutter .............. H04L 12/40032 |
| 2022/0376947 | A1* | 11/2022 | Antonsson .............. H04L 12/40 |

OTHER PUBLICATIONS

International Standard; "ISO 11898-2—Road vehicles—Controller area network (CAN)—Part 2: High-speed medium access unit"; 38 pages (Dec. 15, 2016).

CAN in Automation (CiA) e.V .; "Draft Specification Proposal CiA 601-4, Version 2.1.0, CAN FD node and system design, Part 4: Signal Improvement"; 20 pages (Oct. 7, 2021).

Schuermans, P.; "Sicheres Serielles Bus-Konzept Auf Der Basis Des Can-Bus"; Signal Und Draht: Signalling & Datacommunication, Euralipress, DE, vol. 83, No. 10; pp. 248-252 (Oct. 1, 1991) With English Machine Translation.

NXP; "TJA1055 Enhanced fault-tolerant CAN transceiver, Rev. 5"; Product data sheet; 26 pages (Dec. 6, 2013).

"AU5790 Single wire CAN transceiver", Integrated Circuits Data sheet, Philips Semiconductors, 20 pgs, (May 18, 2001).

Infineon; "TLE9250X Z8F57889425, rev. 1.4"; retrieved from the internet at: https://www.infineon.com/dgdl/Infineon-Z8F57889425_TLE9250X-ApplicationNotes-v01_40-EN.pdf?fileId=5546d4625debb399015e14d43ba35991; 17 pages (Jul. 27, 2020).

Non Final Office Action; U.S. Appl. No. 17/248,224; 20 pages Mar. 1, 2022).

Non Final Office Action; U.S. Appl. No. 17/249,674; 16 pages (Mar. 9, 2021).

Notice of Allowance; U.S. Appl. No. 17/248,224; 9 pages (Sep. 22, 2022).

NXP; "UJA1166a High-speed CAN transceiver with 5 V LDO and Sleep mode, Revision 1"; Data Sheet; 35 pages (Aug. 23, 2019).

U.S. Appl. No. 17/660,393 filed Apr. 22, 2022, not yet published, 83 pages.

U.S. Appl. No. 17/249,674; 20 pages (Mar. 9, 2021).

U.S. Appl. No. 17/805,122; 34 pages (Jun. 2, 2022).

Liebetrau, Thomas et al., "Energy Saving in Automotive E/E Architectures", Dec. 31, 2012, pp. 1-21, White paper, Infineon, retrieved from the internet at https://www.eletimes.com/wp-content/uploads/2017/02/Infineon-Energy_Saving_in_automotive_EE_Architectures.pdf on Jul. 19, 2022.

Notice of Allowance; U.S. Appl. No. 17/805,122; 10 pages (Apr. 12, 2023).

* cited by examiner

TRANSCEIVER DEVICE

CROSS-REFERENCE TO RELATED APPLICATIONS

This application claims the priority under 35 U.S.C. § 119 of European patent application no. 21177600.0, filed Jun. 3, 2021, the contents of which are incorporated by reference herein.

TECHNICAL FIELD

The present disclosure relates to a transceiver and a controller for a network node, a network containing the node and associated methods of operation and corresponding computer programs. In particular, although not exclusively, the present disclosure relates to a Controller Area Network (CAN) transceiver, a CAN controller, a CAN device, a CAN network and associated methods of operation.

BACKGROUND

In-vehicle network (IVN) busses, such as CAN (Controller Area Network), CAN FD (CAN with Flexible Data-Rate), LIN (Local Interconnect Network), FlexRay, Ethernet based network busses, and other types, can be used for communications within vehicles. For example, controller area network (CAN) bus is a message-based communications bus protocol that is often used within automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-2:2016 standard, can provide higher data rates. But the standardized CAN data link layer protocol is still in further process of being extended to provide even higher data rates. A further extension, referred to as CAN XL, with a new level scheme allowing even higher data rates is in the definition phase discussed under CiA610 (CAN in Automation), is discussed in specification CiA610, and is moving towards standardization in the form of either a further update of the existing ISO11898 standards or a new standard.

FIG. 1a shows a Controller Area Network (CAN) bus network 100 comprising multiple nodes, or devices 102a-e and a twisted pair cable providing a CAN bus 104 for communicating a differential signal between the multiple CAN nodes 102a-2 via stubs (e.g., stubs 106a-c). There are termination resistors 108a,b at the end nodes (node 1 and 2) 102a, 102b, as an example is shown in FIG. 1a.

FIG. 1b shows a schematic block diagram of a CAN node, or device, 102 coupled to the CAN bus, 104 of FIG. 1a. The CAN node 102 comprises a CAN controller 110 and a CAN transceiver 112. The CAN controller 110 may be implemented by a processor, such as a microprocessor, configured to implement a CAN protocol of operation within the CAN bus network 100. The CAN transceiver 112 interfaces the CAN controller 110 with the CAN bus 104. In one or more examples, the CAN transceiver 112 can operate with no, or limited, circuitry for understanding or implementing the CAN protocol and so may be of relatively limited power consumption compared to the processor of the CAN controller 110.

The CAN controller 110 has a transmit output 116 and a receive input, 118. The CAN transceiver 112 has a transmit input 120, a receive output 122 and a bus terminal 124, which may also be referred to as a bus port. The bus terminal 124 may comprise a bus terminal resistor (RBUS) 125. The bus terminal 124 is coupled to the two signal lines of the CAN bus 104. The transmitter output 116 of the CAN controller 110 is coupled to the transmit input 120 of the CAN transceiver 112. The receive input 118 of the CAN controller 110 is coupled to the receive output 122 of the CAN transceiver 112.

The CAN transceiver 112 comprises a transmitter 111 and a receiver 114. The transmitter 111 has an input coupled to the transmit input 120 of the CAN transceiver 110 and outputs connected to the CAN bus terminal 124 of the CAN transceiver 112. The transmitter 111 is configured to convert data received at the transmit input 120 of the CAN transceiver 112 to a differential signal for the CAN bus 104 via the bus terminal 124.

The receiver 114 has inputs coupled to the CAN bus terminal 124 and an output coupled to the receiver output 122 of the CAN transceiver 112. The receiver 114 is configured to convert a differential voltage signal on the CAN bus 104 into data for the CAN controller 110. The general architecture of the CAN node shown in FIG. 1b applies equally to all flavours of CAN, including CAN FD for example.

The present disclosure relates to providing a transceiver device with improved functional safety for use in next generation autonomous vehicles.

SUMMARY

According to a first aspect of the disclosure, there is provided a transceiver device for communicating between a network protocol controller and a network bus, the transceiver device comprising: transceiver circuitry configured to transmit and receive data on the network bus using a first physical layer protocol; and monitoring circuitry configured to determine a measured property of the network bus, in which the transceiver device is configured to: determine whether the measured property indicates an error condition; and reconfigure the transceiver circuitry to transmit and receive data on the network bus using a second physical layer protocol in response to determining the error condition.

The measured property may indicate an error condition when the measured property falls outside of a tolerable range defined by the first physical layer protocol. The measured property may be obtained periodically or otherwise repeatedly during use of the transceiver.

The first physical layer protocol may be a differential signaling protocol. The second physical layer protocol may be a single-ended signaling protocol.

According to one or more embodiments, the transceiver device is configured to provide an indicator of the error condition to the controller.

According to one or more embodiments, in which the error condition is one or more of: a bus signal is unstable; a high electromagnetic compatibility disturbance; a bus line is open or shorted to ground or supply; a recessive voltage on the bus is out of range as specified in the first protocol; bit signal symmetry on the bus is out of range as specified in the first protocol; bus termination failure; and shorting between bus signal lines of a differential bus.

According to one or more embodiments, the error condition corresponds to a variance from the first physical layer protocol with respect to an operational state of one or more of: number of communication channels; communication frequency; symbol period; background interference level; signal voltage levels; and termination impedance.

The first and/or second physical layer protocols may define one or more of: number of communication channels; communication frequency; symbol period; background interference level; signal voltage levels; and termination impedance.

According to one or more embodiments, the transceiver device is configured to: determine an error condition that a noise signal on the bus is greater than a threshold level; and may reconfigure the transceiver circuitry to transmit data by driving a higher current level on the bus in response to determining the error condition. The noise signal may be due at an EMC event.

According to one or more embodiments, the transceiver device is configured to: determine an error condition that a bus line of a differential-signaling bus is open, shorted to ground or to a power supply level; and may reconfigure the transceiver circuitry to transmit and receive data in a single-ended mode using another bus line of the bus in response to determining the error condition.

According to one or more embodiments, the transceiver device is configured to: determine an error condition that a voltage level of the bus is out of a range specified by the first protocol; and may reconfigure the transceiver circuitry to apply a bias to the bus to bring the voltage level back into the specified range in response to determining the error condition.

According to one or more embodiments, the transceiver device is configured to: determine an error condition that a bit signal level symmetry of the bus is out of a range specified by the first protocol, or a bit length variation of symbols on the bus is out of a range specified by the first protocol; and may provide an indicator of the error condition to the controller.

According to one or more embodiments, the transceiver device is configured to: determine an error condition of a bus termination failure or change in termination; and may reconfigure the transceiver circuitry to transmit data by driving a different current for each respective signal level on the bus in response to determining the error condition.

According to one or more embodiments, the transceiver device is configured to: determine an error condition of short-circuit between the differential signaling lines of the network bus; and may reconfigure the transceiver circuitry to transmit and receive data using single-ended signalling in the physical layer.

According to one or more embodiments, the transceiver circuitry comprises: a first module configured to transmit and receive data on the network bus using the first physical layer protocol; and may a second module configured to transmit and receive data on the network bus using the second physical layer protocol that is different from the first protocol.

According to one or more embodiments, the transceiver further comprises diagnostics circuitry configured to do one or more of the following: receive the measured property of the network bus; compare the measured property with one or more communication error entries stored in a look-up table; determine an adaptation of the first physical layer protocol to provide the second physical layer protocol if the measured property matches a communication error entry stored in the look-up table; and control the transceiver circuitry to operate according to the adapted physical layer protocol.

According to one or more embodiments, the adaptation of the physical layer protocol is obtained from the look-up table.

According to one or more embodiments, the diagnostics circuitry is configured to provide a message for the network controller in response to determining that the measured property matches the communication error entry.

A network bus may be a single-ended signaling bus or a differential signaling bus. The single-ended signaling bus may be a local interconnect network, LIN, bus. The differential signaling bus may be a FlexRay bus.

According to one or more embodiments, the transceiver device is a controller area network, CAN, transceiver device, the one or more network controllers are CAN controllers, and the network bus is a CAN bus. The CAN transceiver, one or more CAN network controllers and the CAN bus may operate according to the CAN FD protocol.

According to a further aspect, there is provided an electronic control unit, ECU, comprising: the transceiver device; and the network controller.

According to a further aspect, there is provided a transceiver device for communicating between a network protocol controller and a network bus, the transceiver device comprising: transceiver circuitry configured to transmit and receive data on the network bus; and monitoring circuitry configured to determine a measured property of the network bus, in which the transceiver device is configured to determine whether the measured property indicates an error condition.

According to a further aspect, there is provided a transceiver device for communicating between a network protocol controller and a network bus, the transceiver device comprising: transceiver circuitry configured to transmit and receive data on the network bus; and monitoring circuitry configured to determine a measured property of the network bus, in which the transceiver device is configured to: determine whether the measured property indicates an error condition; signal an indication of the error to the controller.

The following examples are also disclosed:

Example 1: A safety transceiver device that is placed in the data path between microcontroller and CAN, CANFD or next generation CAN bus system that is able to monitor (see list under section 1) on a regular and pre-defined base the bus system performance and detect bus system failure or more, or indications of a failure or more to come.

Example 2: A safety transceiver device according to Example 1, whereby bus system performance parameters are collected and related to a pattern or patterns, indicating a bus failure or multiple, indicating a failure or multiple to come, or a proper operation. The observed patterns are stored.

Example 3: A safety transceiver device according to Example 1 & 2, whereby the stored pattern is translated to a failure mode or modes, and, in addition, to a prediction of failure mode or modes, or the prediction of proper observation. The results are stored.

Example 4: A safety transceiver device according to Example 3 that prepares the status of failure mode or modes, the prediction of a failure mode or modes, or the observation of correct operation for sending the status report by use of the bus system or by use of the microcontroller interface.

Example 5: A safety transceiver device according to Example 3, whereby the status of failure mode or modes, the prediction of a failure mode or modes, or the observation of correct operation is calculated or mapped into a control vector. The control vector is used to configure the transceiver transmitter.

Example 6: A safety transceiver device according to Example 5, whereby a control vector is used to configure the transceiver transmitter, and the transmitter function follows the specification of CiA601-4, in addition, includes observation of an non-terminated bus failure and able to modify the control vector in order to accommodate to the additionally observed failure.

Example 7: A safety transceiver device according to Example 6, whereby the latest results from all monitoring, failure mode and prediction translation, control vector, and proper operation and stored in a dedicated diagnostics function.

Also disclosed is a transmitter of a transceiver, for example a SIC CAN Transmitter: connected to a CAN, CANFD or any next generation CAN bus system, applying e.g. SIC CAN signal improvement technology as specified in CiA Specification 601-4 (CAN in Automation), operating in a dynamic mode, reconfigured in pre-defined timeslots or single-triggered by safety phenomena, after observation by Monitoring and Reconfiguration to reconfigure CAN Transmitter, and provide status update to the Safety Diagnostic and/or status update on CANFD or any next generation CAN bus system or local host (microcontroller).

BRIEF DESCRIPTION OF THE DRAWINGS

One or more embodiments will now be described by way of example only with reference to the accompanying drawings.

DETAILED DESCRIPTION

When approaching autonomous driving (AD) level 3 (see, e.g., SAE standard J3016) and beyond, there is a need to develop and implement extended means of functional safety in order to comply with more stringent functional safety requirements and goals.

In an AD vehicle system, sensors, actuators, communication elements and lines, computational elements, and decision-making instances may be combined. A standardized way to describe means of functional safety and its requirements for vehicle systems or sub-systems uses the Automotive Safety Integrity Level, ASIL, classes introduced in ISO 26262.

For compliance with AD level 3 and beyond, the communication system in a vehicle should meet the extended requirements of an "ASIL-rated" system rather than being "quality managed". To meet the extended requirements of an "ASIL-rated" system, the communication system or its sub-systems should provide additional functionality of monitoring, controlling, and communicating to a higher hierarchical level within the architecture of the vehicle system.

Figure 1A:
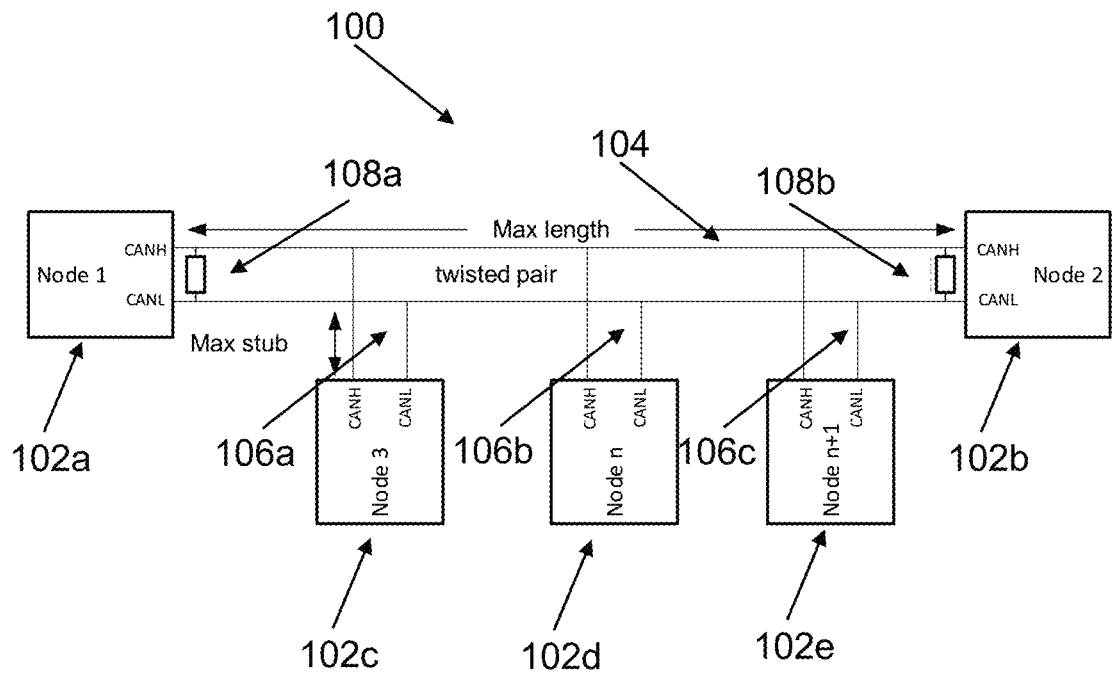
FIG. 1a illustrates a schematic block diagram of a conventional CAN network bus connecting CAN nodes.
Figure 1B:
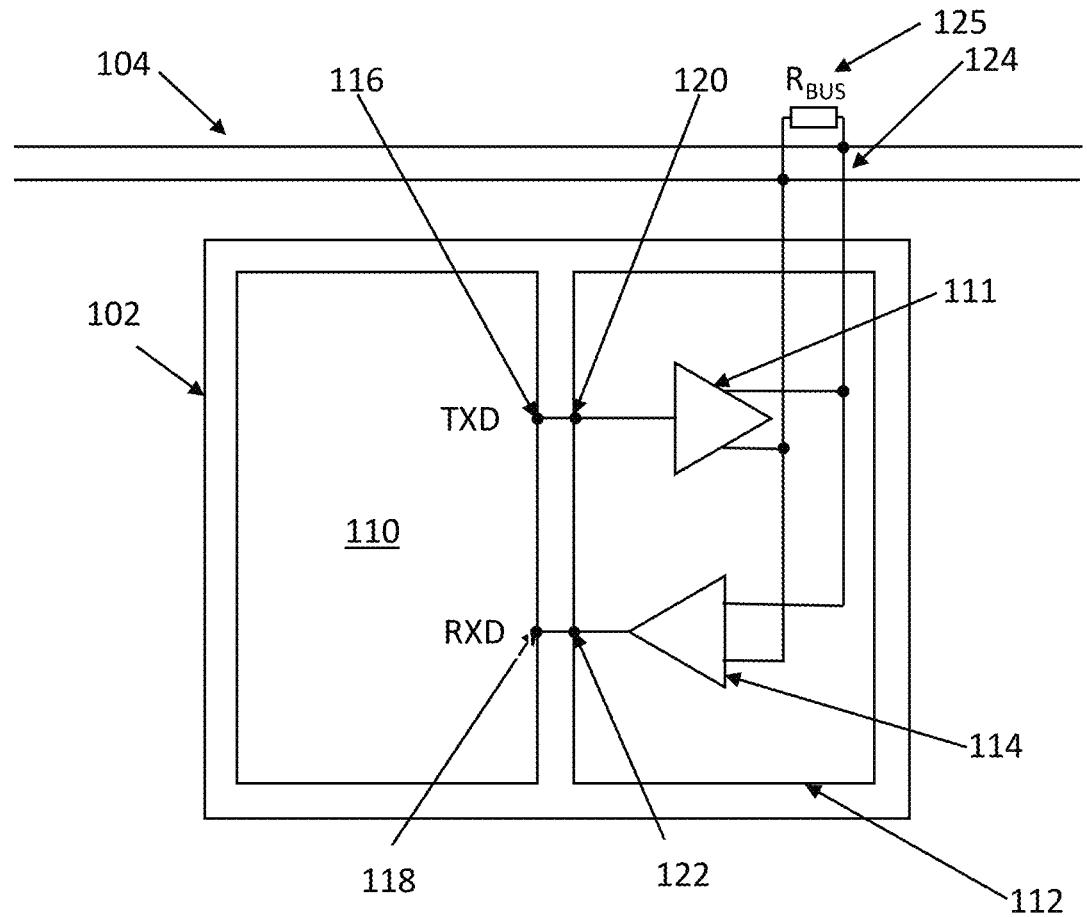
FIG. 1b illustrates a schematic block diagram of a conventional CAN node.

More specifically, critical communication systems or sub-systems, which may include a CAN bus network and node described with respect to FIGS. 1a and 1b, need to ensure redundancy (high availability) to meet the extended requirements of functional safety. This is a relevant cost factor, adding to the overall cost level of the vehicle system. In some aspects, the present disclosure is directed to mitigating loss of functionality following a communications failure of a CAN node whilst providing the required safety infrastructure.

Figure 2:
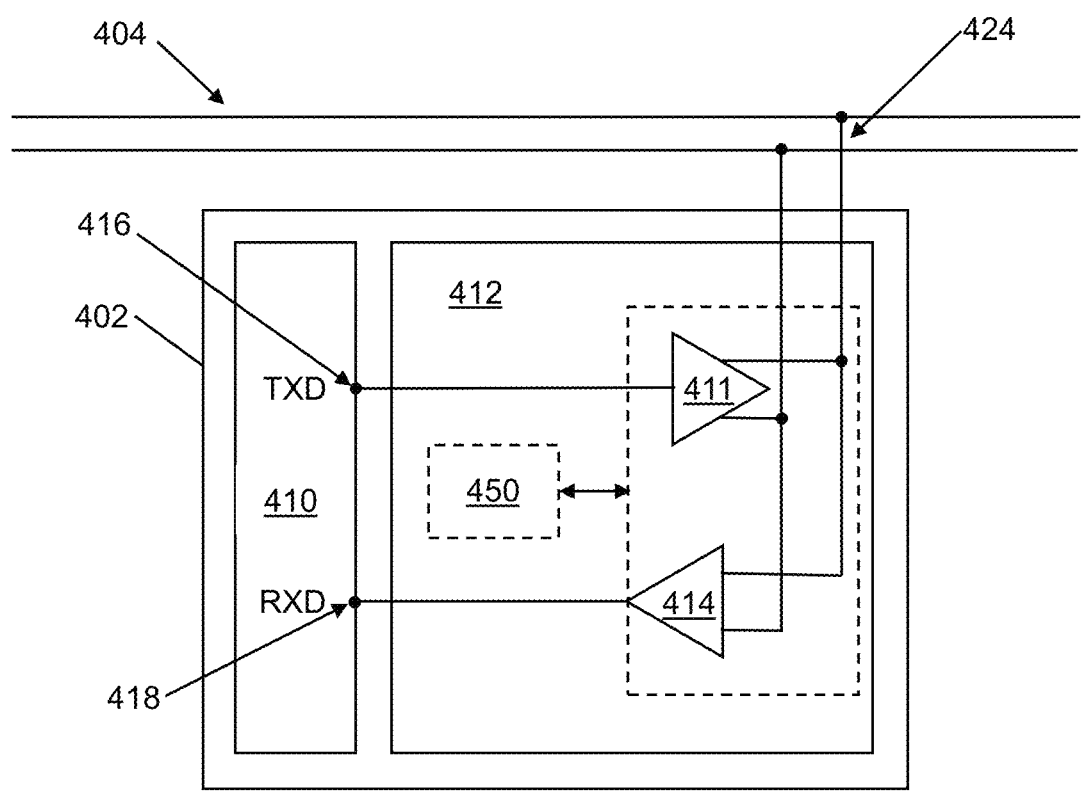
FIG. 2 shows an example schematic block diagram of a transceiver device according to an aspect of the disclosure.

FIG. 2 illustrates a node 402 according to an aspect of the disclosure. The node 402 may provide an electronic control unit, ECU, for a vehicle. The node 402 comprises a network protocol controller 410 and a transceiver device 412 for communicating between the network protocol controller 410 and a network bus 404, which in this example is provided by differential signaling bus.

The transceiver device 412 comprises transceiver circuitry 411, 414 configured to transmit and receive data on the network bus 404 using a first physical layer protocol. The first physical layer protocol may define, for example, one or more of: number of communication channels; communication frequency; symbol period; background interference level; signal voltage levels; and termination impedance.

For example, the first physical layer protocol may be defined by a CAN protocol.

In the illustrated example, the transceiver device 412 comprises monitoring circuitry 450 configured to determine a measured property of the network bus 404. The monitoring circuitry 450 is configured to determine whether the measured property indicates an error condition. In response to determining the error condition, the transceiver device 412 is configured to reconfigure the transceiver circuitry 411, 414 to transmit and receive data on the network bus using a second physical layer protocol. The second physical layer protocol may define the same or different attributes to the first physical layer protocol.

The second physical layer protocol may be a different type of protocol to the first physical layer protocol. For example, the first physical layer protocol may be a differential signaling protocol and the second physical layer protocol may be a single-ended protocol. Alternatively, the second physical layer protocol may be an adapted form of the first physical layer protocol. For example, second physical layer protocol may be a protocol in which a communication frequency is different from the first physical layer protocol, for example reduced, or signal voltage levels are shifted.

In this way, the transceiver device is able to adapt communication to the Prescence of a detectable error condition on the network bus 404.

In some examples, the error condition and the associated reconfiguration is one or more of the following.

Error: Instable signal (amplitude or timing/phase shift) or higher EMC disturbance.

Reconfiguration: In case of too much disturbance on the bus, the transceiver may detect this with EME-filter, after that the transceiver may enter a mode where output current for the signal levels is increased in order to achieve a better signal to noise ratio. When in this mode, the transceiver itself may generate more emission but a more robust (better DPI performance) transceiver is achieved overall.

Error: Single bus line open, or short to ground or supply (CANH, CANL).

Reconfiguration: in response to detecting that an open wire on CANL or CANH, or detecting a short to ground or supply on CANL or on CANH, the transceiver may be reconfigured to continue transmission in a single-ended mode on the other line than the line on which the error was detected (i.e. an error detected on CANL results in SE transmission on CANH).

Error: Common Mode Recessive (ground related shifts in common mode); voltage out of range.

Reconfiguration: The transceiver may detect this error with voltage comparators on CANH and CANL; in case of voltage out of range, the transceiver may bias the bus with a low-ohmic drive to a nominal recessive voltage (e.g. 2.5V).

Error: Bit signal symmetry out of range; bit length variation (on differential signal).

Reconfiguration: The transceiver may detect this error by measuring pulse widths. When incoming pulses are out of range, the transceiver may report to the controller to enable the controller to adjusts timing. When incoming bits are out of range, the transceiver may detect the error and report to controller. Network management may be used to adjust bit timing by the CAN controller adjusting configuration.

Error: Bus termination failure loss or change in termination.

Reconfiguration: The transceiver may detect this error in a dedicated test mode. Upon too low (i.e. too low-ohmic) termination, the transceiver may adjust (increase) the output current drive such that a tolerable output voltage swing is achieved again. In case of too much termination (i.e. too high ohmic) the transceiver may adjust (decrease) the output current such that the tolerable output voltage swing is achieved again.

Error: Shortage between CANH and CANL.

Reconfiguration: The transceiver may be reconfigured to transmit on the shorted wire with one single ended driver. The single-ended signals may have equal voltage swing as the differential signal. Single-ended operation may be implemented in accordance with a local interconnect network, LIN, protocol, for example.

In the illustrated example, the properties of the transceiver circuitry are modified to vary the first physical layer protocol to the second physical layer protocol. Alternatively, the transceiver circuitry could be provided with different modules that are configured to operate in different ways. For example, such transceiver circuitry may comprise first and second modules. The first module is configured to transmit and receive data on the network bus using the first physical layer protocol and the second module is configured to transmit and receive data on the network bus using the second physical layer protocol that is different from the first protocol.

In some examples, the transceiver device further comprising diagnostics circuitry (not shown). The diagnostics circuitry may be configured to provide a message for the network controller in response to determining that the measured property matches an error condition. In some examples, the diagnostics circuitry may be configured to: receive the measured property of the network bus; compare the measured property with one or more communication error entries stored in a look-up table; determine an adaptation of the first physical layer protocol to provide the second physical layer protocol if the measured property matches a communication error entry stored in the look-up table; and control the transceiver circuitry to operate according to the adapted physical layer protocol.

One or more examples of a transceiver device as set out in the present disclosure may advantageously improve robust operation of a communication system by allowing reconfiguration of transceivers operating on the network bus under error conditions. This improved performance may be further appreciated from the following discussion.

Figure 3:
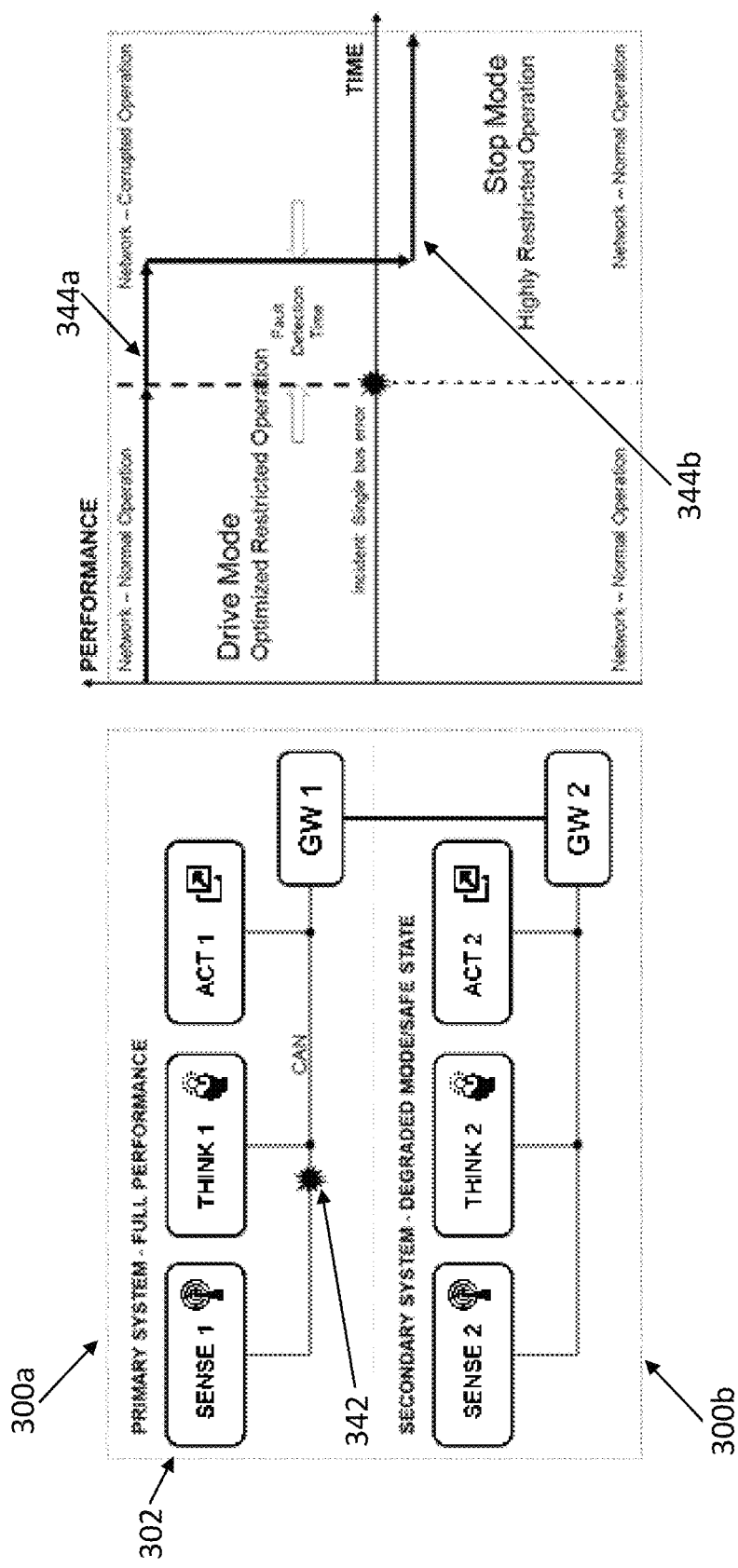
FIG. 3 shows an example schematic scenario of an error in a system in network corrupted operation.

FIG. 3 shows an example schematic scenario of an error 342 in a system. The system is an in-vehicle system having a primary system and a secondary system. As shown, a primary system 300a configured for full performance, experiences the error 342 restricting performance. The error may result from an error condition on the network bus detected by a node 302 of the primary system 300a, for example.

As a result of the error 342, performance is subsequently achieved by a redundant secondary system 300b configured for a degraded or safe state mode of operation. As represented by first and second performance traces 344a and 344b, however, the performance of the degraded or safe state mode of operation of the secondary system 300b may be restricted compared to the full performance of the primary system 300a.

Figure 4:
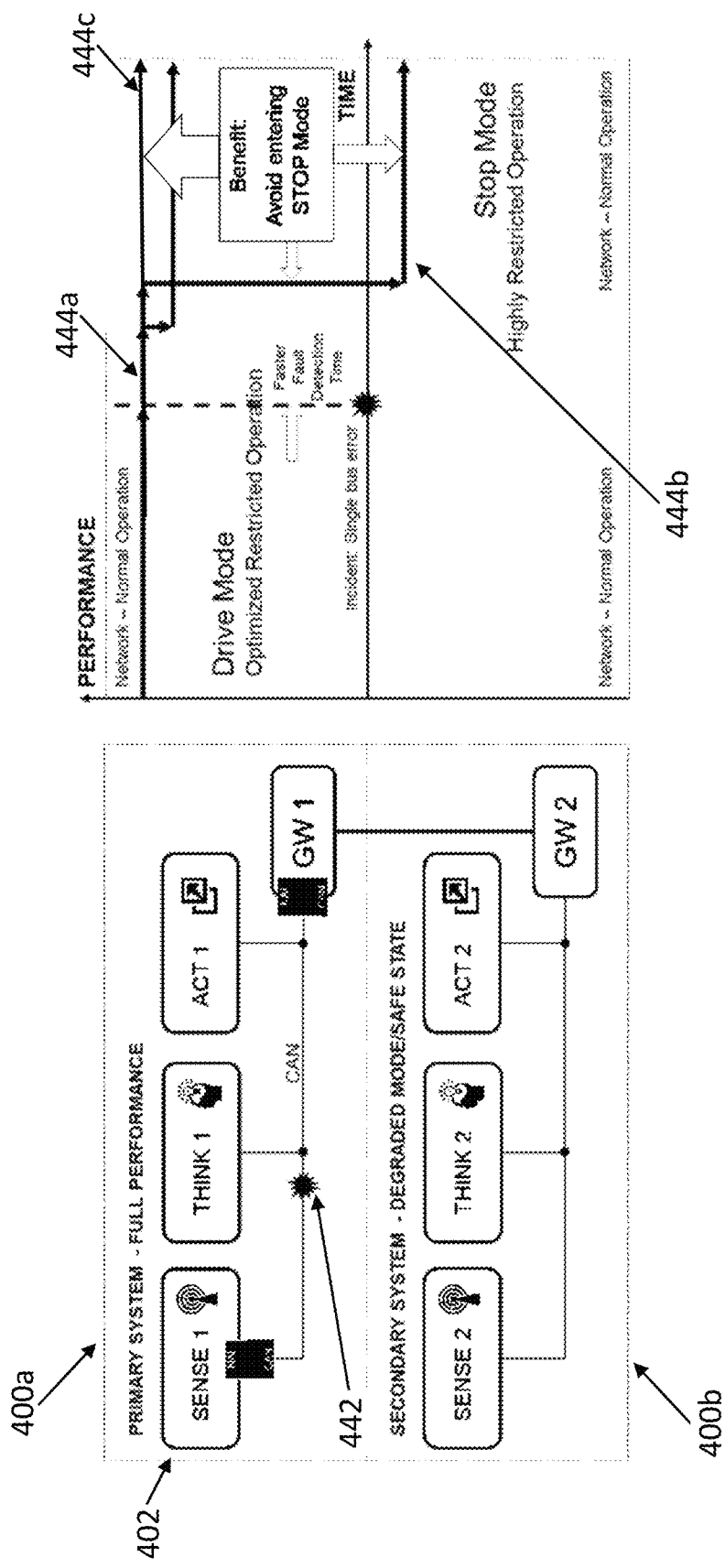
FIG. 4 shows an example schematic scenario of an error in a system in network degraded operation.

FIG. 4 shows an example schematic scenario of an error 442 in a system allowing for a different level of operation by implementing nodes in accordance with those described with reference to FIG. 2.

As shown, a primary system 400a that is configured for full performance experiences the error 442 that obstructs performance. The error 442 can be considered to result from a communication error on the network bus detected by a node 402 of the primary system 400a.

As a result of the error 642, performance has the potential to be improved by providing a secondary system 400b configured for a degraded or safe state mode of operation. The resultant significant restriction in performance discussed with reference to FIG. 3 is instead mitigated by virtue of switching communication with a first network protocol to a second network protocol in response to the error on the network bus: compare second and third performance traces 444b and 444c with first performance trace 444a. In this way, reconfiguring a system into a different state mode of operation avoids restriction in performance.

In other words, one or more examples of a transceiver device as set out in the present disclosure may circumvent the need for a second system with full or degraded performance that can be physically separated from the primary system. In an autonomous driving context, for example, this may avoid moving a vehicle system immediately into a safe state. In such examples, the system may be able to provide exactly the same functions using the second network protocol and be unaffected by the error affecting the performance of the first network protocol. As such, the system may flag its loss of a safety fall-back to a user via the controller of the node that detects the bus error condition, and recommend that the system is serviced to restore the primary system, for example.

Furthermore, one or more examples of a transceiver device as set out in the present disclosure may support the ASIL classification and ISO 26262 compliance of a vehicle's communication system or sub-systems that connects, for example, a sensor, sensors, or a sensor field with the AD central computational unit as well as an actuator, actuators, or an actuator field.

Figure 5:
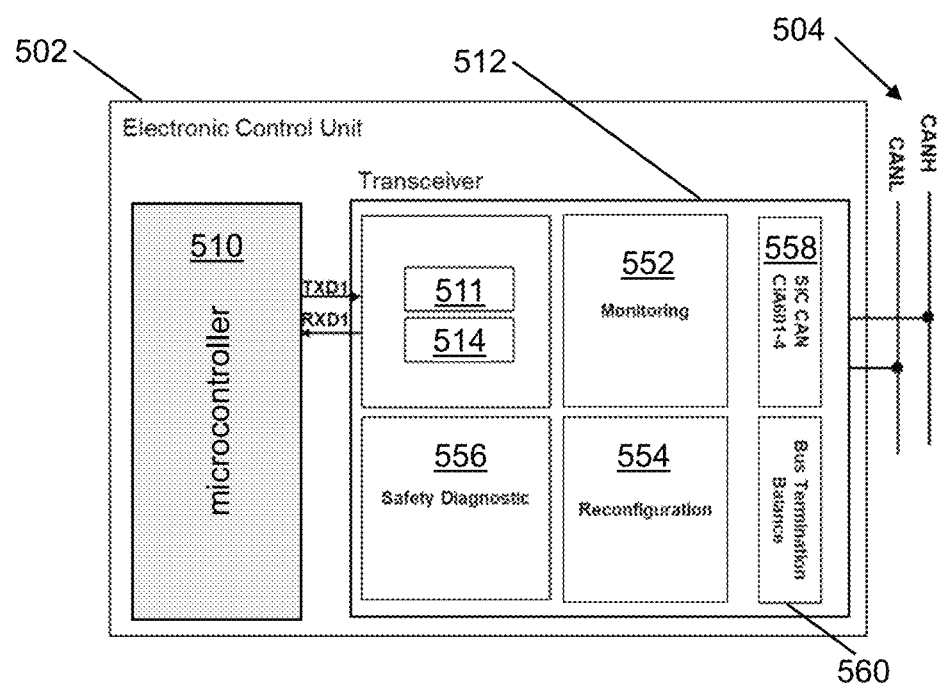
FIG. 5 shows an example schematic block diagram of an electronic control unit, ECU, according to an aspect of the disclosure.
Figure 6:
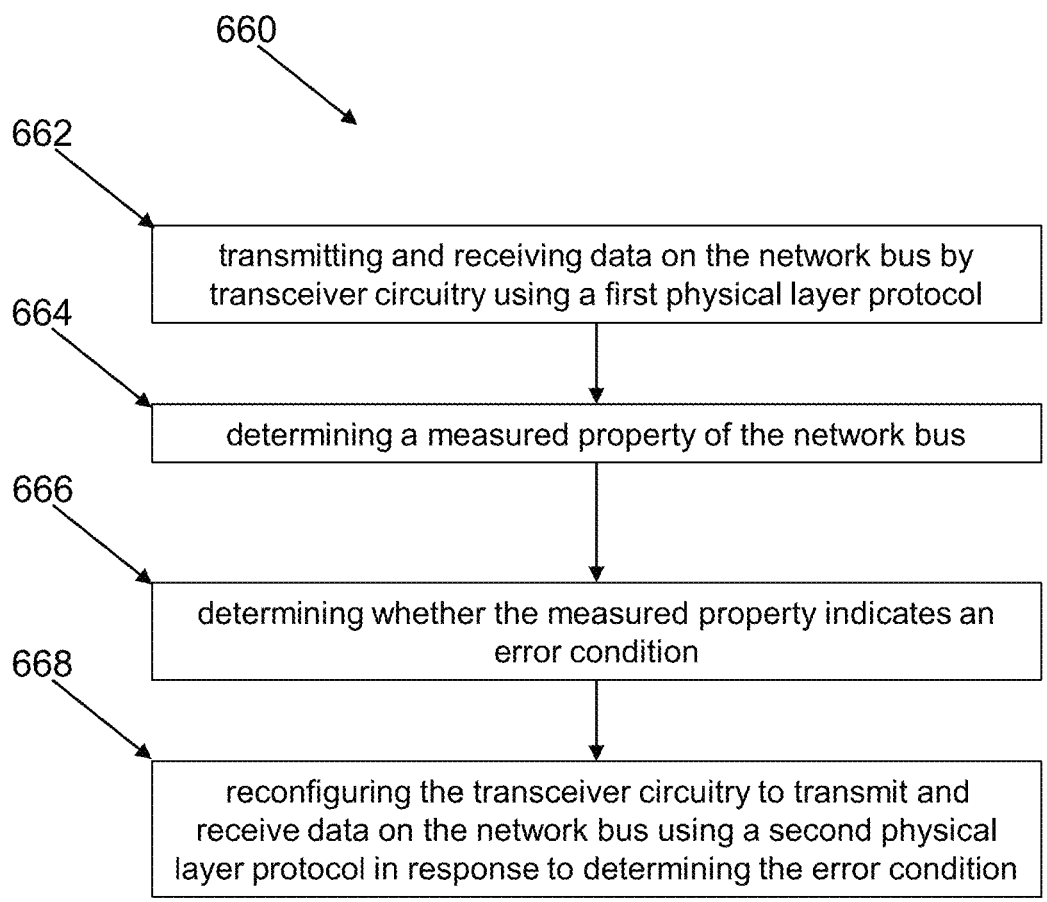
FIG. 6 shows an example method of operating a transceiver device according to an aspect of the disclosure.

FIG. 5 shows an example schematic block diagram of an electronic control unit, ECU, according to another aspect of the disclosure.

The ECU 502 comprises a microcontroller 510 and a transceiver 512. The microcontroller may provide the same functionality as the controller described previously with reference to FIG. 2. The transceiver 512 comprises a number of functional modules, as described below.

Monitoring 552 may continuously assess the performance of the CAN, CANFD or any next generation CAN bus system, dynamically determine bus parameters and characteristics, and/or detects one or more failures (safety phenomena), such as the examples in the following list (also see the monitoring circuitry functions of FIG. 2):

a. Instable signal or higher EMC disturbance;
b. Single bus line open, or short to ground or supply (CANH, CANL);
c. Recessive voltage out of range;
d. Bit signal symmetry out of range;
e. Bus termination failure;
f. Shortage between CANH and CANL.

Reconfiguration 554 of the transmitter of the transceiver, Signal Improvement Capability (SIC) based transmitters may be provided. This function may trigger on events signaled by Monitoring 552 and may use, but not limited to, the following mechanisms to control the CAN Transmitter in accordance to a (mode) table where the control parameters for safety phenomena are stored. A frequency of the dynamic update or reconfiguration cycle may depend on the vehicle system function that is carried out by the connected network nodes. The Reconfiguration 554 may have the capabilities described previously with reference to FIG. 2, for example, to—activate and to control a SIC CAN signal improvement function 558 in a dynamic mode; not in a pre-configured (static) mode and not as described in the specification CiA 401-4 (SIC); control the SIC CAN signal improvement function 558 based on a detected short or open (according to 1b) or a further failure (out of the list above in 1, for example) on the CAN bus system.

The transmitter may be configured such that different impedance schemes are applied on the CANFD or any next generation CAN bus system that may vary from the CAN standard as described in ISO11898:2016.

Bus Termination Balance 560 may be provided as a companion function to the SIC CAN Transmitter, merged or kept separately, and enriches the transmitter capabilities in case of a bus system performance degradation caused by a faulty bus termination of the CAN Network. This functionality may be triggered by the Monitoring or by Bus Termination Balance itself when observing the CAN, CANFD or any next generation CAN bus performance and the correct termination of line CANH and CANL. For example, the bus termination balance module may detect a change or loss of termination of the bus in a dedicated test mode. Upon too low (i.e. too low-ohmic) termination, the Bus Termination Balance 560 may adjust (increase) the output current drive such that a tolerable output voltage swing is achieved again. In case of too much termination (i.e. too high ohmic) the Bus Termination Balance 560 may adjust (decrease) the output current such that the tolerable output voltage swing is achieved again. The monitor and control of the bus termination may be based on a dynamic approach during CANFD network operation; it is not necessarily forced to a firm/static voltage level as it is known from CAN Partial Networking.

Safety Diagnostic 556 may store the latest information about the performance of the CAN, CANFD or any next generation CAN bus system (obtained from Monitoring 552), status and mode of CAN Transmitter (e.g. CAN Transmitter 558), and Bus Termination Balancing 560, and makes this information accessible, and/or send this information on the CAN, CANFD or any next generation CAN bus system and/or to the local host (microcontroller 510). For this communication, a CAN frame may be initiated by the Safety Diagnostics 556 to be sent on the CAN bus or communicated to the microcontroller 510 via a dedicated communication channel besides the standard Rx/Tx communication channel. Additionally, the Safety Diagnostics 556 may create and update device-relevant data that indicates the proper function of the device during operation.

The transceiver also comprising communication circuitry for transmitting 511 and receiving 514 data to and from the microcontroller 510, as is known in the art.

FIG. 4 shows an example method 460 of operating a transceiver device according to an aspect of the disclosure. The method 460 comprises: transmitting and receiving 462 data on the network bus by transceiver circuitry using a first physical layer protocol; determining 464 a measured property of the network bus; determining 466 whether the measured property indicates an error condition; and reconfiguring 468 the transceiver circuitry to transmit and receive data on the network bus using a second physical layer protocol in response to determining the error condition.

The invention may be applied in many applications, including for example Advanced Driver Assistance Systems (ADAS) as well the Antilock Braking System (ABS), and Electronic Power Steering (EPS). The invention may also be applied in Domain or Zonal controllers. Further automotive applications are not excluded, neither are non-automotive applications.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A transceiver device for communicating between a network protocol controller and a network bus, the transceiver device comprising:
   transceiver circuitry configured to transmit and receive data on the network bus using a first physical layer protocol; and
   monitoring circuitry configured to determine a measured property of the network bus;
   wherein the transceiver device is configured to:
   determine whether the measured property indicates an error condition; and
   reconfigure the transceiver circuitry to transmit and receive data on the network bus using a second physical layer protocol in response to determining the error condition; and
   wherein the error condition corresponds to a variance from the first physical layer protocol with respect to one or more of the following operational states:
   a number of communication channels;
   a communication frequency;
   a symbol period;
   a background interference level;
   signal voltage levels; or
   a termination impedance.

2. The transceiver device of claim 1, wherein the transceiver device is configured to provide an indicator of the error condition to the controller.

3. The transceiver device of claim 1, wherein the error condition corresponds to one or more of the following conditions:
   a bus signal is unstable;
   a high electromagnetic compatibility disturbance;
   a bus line is open or shorted to ground or supply;
   a recessive voltage on the bus is out of range as specified in the first protocol;
   a bit signal symmetry on the bus is out of range as specified in the first protocol;
   a bus termination failure; or
   shorting between bus signal lines of a differential bus.

4. The transceiver device of claim 1, wherein the error condition corresponds to a variance from the first physical layer protocol with respect to the number of communication channels.

5. The transceiver device of claim 1, wherein the error condition corresponds to a variance from the first physical layer protocol with respect to the communication frequency.

6. The transceiver device of claim 1, wherein the error condition corresponds to a variance from the first physical layer protocol with respect to the symbol period.

7. The transceiver device of claim 1, wherein the error condition corresponds to a variance from the first physical layer protocol with respect to the background interference level.

8. The transceiver device of claim 1, wherein the error condition corresponds to a variance from the first physical layer protocol with respect to the signal voltage levels.

9. The transceiver device of claim 1, wherein the error condition corresponds to a variance from the first physical layer protocol with respect to the termination impedance.

10. The transceiver device of claim 1, wherein the transceiver device is a controller area network, CAN, transceiver device, the one or more network controllers are CAN controllers, and the network bus is a CAN bus.

11. An electronic control unit, ECU, comprising the transceiver device of claim 1 and the network controller.

12. A transceiver device for communicating between a network protocol controller and a network bus, the transceiver device comprising:
   transceiver circuitry configured to transmit and receive data on the network bus using a first physical layer protocol; and
   monitoring circuitry configured to determine a measured property of the network bus;
   wherein the transceiver device is configured to reconfigure the transceiver circuitry to transmit and receive data on the network bus using a second physical layer protocol in response to determining that the measured property indicates an error condition; and
   wherein the error condition corresponds to:
   (1) a noise signal on the bus that is greater than a threshold level; and the transceiver device is further configured to reconfigure the transceiver circuitry to transmit data by driving a higher current level on the bus in response to determining the error condition; or
   (2) a bus line of a differential-signaling bus that is open, shorted to ground, or shorted to a power supply level; and the transceiver device is further configured to reconfigure the transceiver circuitry to transmit and receive data in a single-ended mode using another bus line of the bus in response to determining the error condition; or
   (3) a voltage level of the bus that is out of a range specified by the first protocol; and the transceiver device is further configured to reconfigure the transceiver circuitry to apply a bias to the bus to bring the voltage level back into the specified range in response to determining the error condition; or
   (4) a bus termination failure or a change in bus termination; and the transceiver device is further configured to reconfigure the transceiver circuitry to transmit data by driving a different current for each respective signal level on the bus in response to determining the error condition; or
   (5) a short-circuit between the differential signaling lines of the network bus; and the transceiver device is further configured to reconfigure the transceiver circuitry to transmit and receive data using single-ended signalling in the physical layer.

13. The transceiver device of claim 12,
wherein the error condition corresponds to the bus line of the differential-signaling bus that is open, shorted to ground, or shorted to the power supply level; and
wherein the transceiver device is configured to reconfigure the transceiver circuitry to transmit and receive data in the single-ended mode using the other bus line of the bus in response to determining the error condition.

14. The transceiver device of claim 12,
wherein the error condition corresponds to the voltage level of the bus that is out of the range specified by the first protocol; and
wherein the transceiver device is configured to reconfigure the transceiver circuitry to apply the bias to the bus to bring the voltage level back into the specified range in response to determining the error condition.

15. The transceiver device of claim 12,
wherein the error condition corresponds to the bus termination failure or the change in bus termination; and
wherein the transceiver device is configured to reconfigure the transceiver circuitry to transmit data by driving the different current for each respective signal level on the bus in response to determining the error condition.

16. The transceiver device of claim 12,
wherein the error condition corresponds to the short-circuit between the differential signaling lines of the network bus; and
wherein the transceiver device is configured to reconfigure the transceiver circuitry to transmit and receive data using single-ended signalling in the physical layer.

17. The transceiver device of claim 12, wherein the error condition corresponds to the noise signal on the bus that is greater than the threshold level; and the transceiver device is further configured to reconfigure the transceiver circuitry to transmit data by driving the higher current level on the bus in response to determining the error condition.

18. A transceiver device for communicating between a network protocol controller and a network bus, the transceiver device comprising:
transceiver circuitry configured to transmit and receive data on the network bus using a first physical layer protocol; and
monitoring circuitry configured to determine a measured property of the network bus;
wherein the transceiver device is configured to:
determine whether the measured property indicates an error condition; and
reconfigure the transceiver circuitry to transmit and receive data on the network bus using a second physical layer protocol in response to determining the error condition; and
wherein the transceiver device further comprises:
(1) a first module configured to transmit and receive data on the network bus using the first physical layer protocol; and a second module configured to transmit and receive data on the network bus using the second physical layer protocol that is different from the first protocol; or
(2) diagnostics circuitry configured to:
receive the measured property of the network bus;
compare the measured property with one or more communication error entries stored in a look-up table;
determine an adaptation of the first physical layer protocol to provide the second physical layer protocol if the measured property matches a communication error entry stored in the look-up table; and
control the transceiver circuitry to operate according to the adapted physical layer protocol.

19. The transceiver device of claim 18, further comprising the-diagnostics circuitry.

20. The transceiver device of claim 19, in which the adaptation of the physical layer protocol is obtained from the look-up table.

21. The transceiver device of claim 19, in which the diagnostics circuitry is configured to provide a message for the network controller in response to determining that the measured property matches the communication error entry.

22. The transceiver device of claim 18, wherein transceiver device further comprises the first module configured to transmit and receive data on the network bus using the first physical layer protocol; and the second module configured to transmit and receive data on the network bus using the second physical layer protocol.

* * * * *